(12) United States Patent
Broderick et al.

(10) Patent No.: US 8,662,544 B2
(45) Date of Patent: Mar. 4, 2014

(54) PIPE JOINT AND SEAL WITH BAND CLAMP

(75) Inventors: Ryan Broderick, Carteret, NJ (US); Kurry Emmons, Branchburg, NJ (US)

(73) Assignee: Metal Textiles Corporation, Edison, NJ (US)

( * ) Notice: Subject to any disclaimer, the term of this patent is extended or adjusted under 35 U.S.C. 154(b) by 293 days.

(21) Appl. No.: 13/095,208

(22) Filed: Apr. 27, 2011

(65) Prior Publication Data
US 2011/0272941 A1 Nov. 10, 2011

Related U.S. Application Data

(60) Provisional application No. 61/331,519, filed on May 5, 2010.

(51) Int. Cl.
*F16L 23/08* (2006.01)
*F16L 23/22* (2006.01)

(52) U.S. Cl.
USPC ............ 285/334.5; 285/332.2; 285/367; 285/364; 285/365

(58) Field of Classification Search
USPC .......... 285/334.5, 364, 365, 366, 367, 406, 285/407, 408, 410, 332.1, 332.2, 332.3
See application file for complete search history.

(56) References Cited

U.S. PATENT DOCUMENTS

| | | | |
|---|---|---|---|
| 1,434,631 A | 11/1922 | Reynolds | |
| 1,977,241 A * | 10/1934 | Parker | 285/332.1 |
| 2,269,664 A * | 1/1942 | Hallerberg | 285/332.3 |
| 3,265,413 A * | 8/1966 | Currie | 285/334.4 |
| 3,498,649 A * | 3/1970 | Pfeuffer | 285/365 |
| 3,724,878 A | 4/1973 | Ford | |
| 3,820,831 A * | 6/1974 | Swedelius | 285/367 |
| 3,851,902 A | 12/1974 | Robinson | |
| 3,964,773 A | 6/1976 | Stade et al. | |
| RE28,912 E * | 7/1976 | Stade et al. | 285/367 |
| 4,265,471 A | 5/1981 | Nash | |
| 4,579,374 A * | 4/1986 | Bell | 285/334.4 |
| 4,779,901 A | 10/1988 | Halling | |
| 4,832,380 A * | 5/1989 | Oetiker | 285/328 |
| 5,040,805 A | 8/1991 | Ozora et al. | |
| 5,411,274 A | 5/1995 | Yahagi et al. | |
| 5,415,439 A | 5/1995 | Wells | |

(Continued)

OTHER PUBLICATIONS

Clampco website, 5 pages 2007 V-Band Clamps/couplings (1 page), Clampco made to order V-Band clamps/couplings (2 pages), Product literature (2 pages).

*Primary Examiner* — James Hewitt
(74) *Attorney, Agent, or Firm* — Carella Byrne et al.; Elliot M. Olstein; William Squire

(57) ABSTRACT

Each of two exhaust pipes has a flared flange with the flange on one pipe spaced from the pipe's end edge forming a corner with the pipe's end segment. A triangular seal between the two flanges abuts the pipe segment and corner. One flange has an outer convex spherical surface and a concave inner spherical surface which engages the outer convex spherical surface of the seal at a contact point. Two depending conical legs of a U shaped in section band clamp engage and force the flanges and pipe corner and end segment against the seal. A clamp leg engages the outer convex spherical surface of the one flange at a tangential contact point. The one clamp leg, the one flange and the seal exhibit two tangential respective contact points defining a plane normal to that flange providing enhanced stress concentration on the seal and flanges.

33 Claims, 10 Drawing Sheets

(56) References Cited

U.S. PATENT DOCUMENTS

| | | |
|---|---|---|
| 5,433,070 A | 7/1995 | Amelio |
| 5,499,825 A | 3/1996 | Maeda et al. |
| 5,683,119 A | 11/1997 | Emmons et al. |
| 6,312,022 B1 | 11/2001 | Brophy et al. |
| 6,685,238 B1 | 2/2004 | Pouillard |
| 7,249,790 B2 | 7/2007 | Potts et al. |
| 7,320,486 B2 | 1/2008 | Geppert et al. |
| 7,520,539 B2 | 4/2009 | Ignaczak et al. |
| 8,328,243 B2 * | 12/2012 | Matthis et al. ............ 285/367 |
| 2006/0082142 A1 | 4/2006 | Berchtold et al. |
| 2006/0082154 A1* | 4/2006 | Hartig et al. ............ 285/408 |
| 2006/0202480 A1 | 9/2006 | Cassel et al. |
| 2011/0074150 A1* | 3/2011 | Drost et al. ............ 285/363 |

\* cited by examiner

PIPE JOINT AND SEAL WITH BAND CLAMP

Priority is claimed on U.S. provisional application Ser. No. 61/331,519 filed May 5, 2010, incorporated by reference herein in its entirety.

This invention relates to pipe joints employing spherical seals for automotive exhaust pipe systems, and more particularly, to pipe joints employing band clamps to secure two pipes in fixed relationship.

Of interest are commonly owned U.S. Pat. Nos. 5,683,119 and 6,312,022, incorporated by reference in their entirety herein.

U.S. Pat. No. 5,683,119 discloses a knitted wire mesh seal used to join two pipes in an automotive exhaust system. The seal, which is annular, is wedge shaped at one edge, which edge is forced in wedged relationship into an enclosed corner formed by the outer cylindrical surface of one pipe and a flange attached to the one pipe outer surface. The seal and flange have mating spherical surfaces.

U.S. Pat. No. 6,312,022 ('022 patent) discloses a pipe joint and seal of knitted wire mesh. A flange with a conical portion is welded to the outer surface of an annular spherical segment of one pipe. An annular seal has a spherical outer convex surface which mates with the spherical inner concave surface of the annular segment of the one pipe. The radius of the pipe segment inner surface is larger than the radius of the mating seal outer surface forming a first tangential point of contact (FIG. 7) between the two surfaces.

The seal has an inner concave spherical surface that mates with the outer convex spherical surface of the flange of the other pipe at a second tangential point. The radius of the inner concave spherical surface of the seal is larger than the radius of the outer convex spherical surface of the other pipe flange so these surfaces mate at the second tangential point. The patent discloses the first and second tangential points provide enhanced stress concentration to provide improved sealing action. However, unlike the instant disclosure of the embodiments of the present invention, the tangential points of this reference do not define a plane between a clamp, a pipe flange and an inner seal that is normal to the tangential surfaces a their points of contact at the involved surfaces.

In the '022 patent, a pair of bolts and corresponding springs clamp the outer flange of one pipe against the seal outer surface, which seal inner surface in turn is clamped against the outer surface of the flange of the other pipe. As seen in FIG. 7 thereof, the tangential points P1 and P2 do not define a plane that is normal to the surfaces of the pipe flanges and seals at the tangential points according to the instant disclosed embodiments of the present invention, but rather that plane is at an acute angle to such surfaces at the points of tangency.

Pipe joints for certain automotive exhaust systems employ seals with spherical surfaces. For example, prior art joints and seals are disclosed in U.S. Pat. Nos. 5,499,825 and 5,040,805. Typical exhaust joints comprise a seal, usually formed into a preform of a wire mesh and filler material, and then crushed by dies to the end seal shape as illustrated in the aforementioned patents. The seals may be rigid or compliant in accordance with the seal construction. A lubricant or lubricating material is incorporated in the seal to provide a lubricating surface. The seals generally are annular with a radially outer convex spherical segment surface as shown in U.S. Pat. No. 5,499,825.

Band clamps are in wide use and are commonly used to attach pipes in automotive exhaust systems. Representative band clamps may be seen at the Clampco company web site, for example. Such clamps comprise a split ring having a channel cross section. The clamps include a latch arrangement for forcing the open split ring ends together. This reduces the ring internal diameter in a radially inwardly directed clamping action as the latch is tightened or closed. The latch arrangement includes a lug at the facing spaced apart ring ends. A bolt arrangement is secured to the lugs for forcing the lugs and ring ends together. A band clamp ring may have multiple open facing ends and employ multiple corresponding latches.

Further examples of such clamps are shown in U.S. Pat. Nos. 7,249,790 and 7,520,539.

U.S. Patent Application Publication No. 2006/0202480 to Cassel et al. and U.S. Pat. No. 4,265,471 to Nash are of general interest in showing band clamps and flared collars on pipes being joined by the clamps.

U.S. Pat. No. 7,249,790 to Potts et al. and U.S. Pat. No. 7,520,539 to Ignaczak et al. are of general interest as they show various seals used with band clamps for exhaust pipes.

U.S. Pat. No. 1,434,631 to Reynolds discloses a flexible pipe joint comprising a main socket member to which a pipe is connected. An open socket section is adjustably mounted to and threaded to the periphery of the main socket member, both the member and section are for receiving a wrench for tightening the threaded parts. A ball member is mounted within the member and section. A pair of movable gaskets are in contact with the member and section and a coil spring is included wherein the gaskets act as a ball in close contact with the socket member and section inner surfaces. The spring urges the gaskets apart to compress the gaskets into a tight joint with the member and section. No band clamp is employed.

U.S. Pat. No. 5,433,070 discloses a relatively complex flexible engine inlet duct mounting system to provide a non-turbulent intake airflow to an engine system. No band clamp is employed.

US patent application no. 2006/0082142 discloses an exhaust system which comprises first and second pipe, a sealing ring and a spherical outer clamp. The second pipe extends into the first pipe. The sealing ring is between the first and second pipes to establish a sealing connection therebetween. The first pipe comprises a first tulip shaped expansion comprising inner spherical sealing surfaces and an outer spherical clamp receiving surface.

The second pipe comprises a second tulip expansion with first and second regions. An outer surface of the second region comprises two outer spherical application surfaces and a groove and mate against a sealing surface to define a spherical interface. The spherical clamp comprises an inner spherical surface that mates with the clamp receiving surfaces. The clamp surface, the sealing surface and the application surfaces have a common center of curvature to provide face-to-face contact whether the longitudinal axes of the pipes are coincident or angled relative to each other. The relatively large face-to-face contact is stated to promote a relatively tight connection and is not related to the present invention of the instant disclosed embodiments.

U.S. Pat. No. 4,724,878 to Ford discloses a connector for joining two pipes (hollow members) which exhibit axial, rotational or angular relative movement. This is to be compared to the instant disclosure regarding the present invention where two pipes are joined in fixed relationship. The connector includes a bell housing member adapted for rigid attachment to one of the hollow members. The bell housing member forms a desired flexible connection to the other hollow member by a gasket. The gasket is retained and pressed there against by a gasket hood formed by the flared end of the bell housing member, a retaining ring, and a clamping ring which surrounds the hood. The gasket is especially shaped to have desirable deformation and sealing characteristics. The characteristics of the engaged surfaces are not described in detail and not related to the present invention of the instant disclosed embodiments.

U.S. Pat. No. 3,851,902 discloses a disconnectible pipe union for connecting the ends of two pipes, comprising two flared collars mounted or welded one on each pipe end to form, external and internal converging surfaces. The external surfaces encompass and are engaged by a segmented clamping ring which is adapted to a known manner to urge the collars toward each other. A resilient sealing ring is inserted between the collars and placed between the sloping internal surfaces of the collars to be engaged thereby. The ring in response to a camming action is subjected to a radial elastic deformation while sealing the joint. This disclosure is not related to the present invention of the instant disclosed embodiments.

U.S. Pat. No. 6,685,238 to Pouillard. See FIG. 9 and spherical surfaces S1 and S2. Pipe 1 has a flared portion with surface S1. The device has a circular counterseal 3, a circular seal 4, a gland ring 5, an elastic ring 6 and a back up ring 7, a body 1 and closure and backing part 2. There are union nuts 9 and 10 and two gaskets 11 and 12. This is more complex and different than the instant disclosure of the present invention embodiments.

U.S. Pat. No. 3,964,773 to Stade et al., see Col. 4, lines 65+ which illustrates a band clamp for joining pipes. See FIGS. 4-7, wherein rounded beads 30, 32 (FIGS. 4-5), 88, 90 (FIG. 6) and a band clamp are used wherein the band clamp appears to make line contact with the beads. The beads are arcuate or rounded and not spherical. Col. 3, line 19. However, the structures of FIGS. 8-11 using a different configuration are stated to permit the maximum misalignment. Col. 5, lines 6-7, and thus the beads of FIGS. 4-7 are not as desirable, where there is misalignment of the pipes. In addition, there is no disclosure of a clamp, a pipe flange and seal defining tangential points for transmitting compressive forces from the clamp to the seal in a plane. Their structures are different than the instant disclosure embodiments and present invention.

In U.S. Pat. No. 4,779,901 to Halting, see the abstract in which the joint accepts misalignment of the pipes but there is no plane defined by tangential relationships of the clamp, pipe flange and seal as in the embodiments of the present invention. Annular members 16, 18 have mating spherical segments that accept pipe misalignment. Member 16 has a hub 22 and flange 24 which slides over the hub 22. Flange 24 has at its inner surface 44 a spherical segment of radius of curvature the same as that of the outer surface 34 on the hub 22. Therefore these elements appear to be concentric and mate in close fitting arrangement. Disclosed are U shaped band clamp members 88, 90 with rounded end surfaces, but which surfaces do not abut other structures. A seal 80 has portions 82, 84 and 86. Collar surfaces 54 and 68 are frusto conical. This disclosure is not related to the present invention of the instant disclosed embodiments.

U.S. Pat. No. 5,415,439 to Wells discloses the connection of two pipes using a band type clamp. Pipe 10 has a flared end and pipe 12 has an annular flange, both the end and flange having radiused or arcuate surfaces. The radiused surface of flared end of pipe 10 mates with the radiused surface of flange 18. Col. 2, lines 59-61. The two sections are held together by annular rings. One ring has an inner surface which engages the outer surface of the flared end of pipe 10. The other ring engages a surface on the flange 18. A V-shaped split ring engages the rings. The arms of the split ring urge the rings toward each other by a force created when a nut and bolt are tightened. The surfaces of the split ring arms are not described, but are shown as frusto conical and appear to engage like frusto conical surfaces of the rings. This is different than the instant disclosure embodiments of the present invention in that there is no plane defined by the tangential points of the clamp, pipe flange and seal as in the present invention there being no seal in the disclosed joint among other differences, the clamp arrangement forcing mating surfaces of the pipe flanges into direct sealing contact with each other. This disclosure is not related to the present invention of the instant disclosed embodiments.

U.S. Pat. No. 7,320,486 to Geppert et al. discloses two pipes having end sections that are insertable into each other. The insertion section of one pipe has two spherical zones 5 and 6 of different radii. The receiving end section of the other pipe 4 has one spherical zone of an outer radius identical to the outer radius of zone 6 and whose inner radius is identical to the outer radius of the zone 5. The spherical zones position the pipes slightly angled relative to one another before tightening. The inner radius of the clamping strap in the untightened state is smaller that the outer radius of the spherical end sections such that the sum of the spacing and of the inner radius is greater than the outer radius of the end sections. The spherical radius R2 of the inner pipe section is identical to the spherical radius R4 of the outer pipe section so that these sections mate over a relatively large surface area.

A clamping strap 7 has clamping jaws 8 and 9. The inner surface of the clamping strap 7 rests against the spherical zones 4 and 6 before tightening, with only its circumferential edges 30 and 31 against the spherical zones 4 and 6. When tightened, the strap rests with a large contact surface area in sealing fashion against the zones 4 and 6 in the final position. The edges 30 and 31 are rounded. See col. 6, lines 4-32. Thus it appears that the clamping strap 7 and spherical end sections 4 and 6 of the pipes are substantially concentric in the tightened state such that they abut one another in relatively large contact areas. Col. 6, lines 10-18. This is different than the subject disclosure embodiments. There is no disclosure of a plane defined by tangential points of an outer clamp, an intermediate pipe flange and an inner seal according to the instant disclosure of the present invention. This disclosure is not related to the present invention of the instant disclosed embodiments.

U.S. Pat. No. 5,411,274 to Yahagi et al. discloses a deformable gasket placed between conical surface. This is different than the instant disclosure embodiments and the present invention.

In U.S. Pat. No. 5,433,070 to Amelio reference is made to the disclosure at col. 7, lines 62 et. seq. and FIGS. 4A-C where an outer V-shaped band clamp is shown.

Numerous other joints are known as disclosed in prior art patents. For example, reference is made to U.S. Pat. Nos. 4,097,071, 4,133,558, 4,223,922, 4,452,474, 4,583,768, and 4,928,998among others.

The present inventors recognize several problems with prior art exhaust gas sealed joints using band clamps. They recognize that in such prior art joints the mating surfaces of the clamps, flanges and seals do not provide a sufficiently fluid tight seal for the exhaust gases at the interface of the two joined pipes and mating seals. They also recognize that the prior art seals while adequate for the purposes disclosed, do not provide adequate sealing arrangements with band clamped seals and at the same time, accommodate slight angular misaligned orientations of the two joined pipes, since such pipes need to be joined in fixed non-rotatable relationship. Thus, since band clamped joints are not rotatable after being permanently joined, the prior art band clamped seal joints do not address the problem of such misalignment of the angular orientation of the axes of the two joined pipes prior to being joined and at the time after final clamping of the joint.

An automotive exhaust pipe joint and seal arrangement according to an embodiment of the present invention for joining exhaust pipes in fixed exhaust gas sealed relation to each other comprises first and second exhaust pipes each defining a longitudinal axis and having respective corresponding adjacent first and second ends, each pipe having an outer cylindrical surface and an end edge. The arrangement includes an annular first flange having juxtaposed inner and outer surfaces outwardly flared from the first end of the first pipe outer surface and an annular second flange extending radially outwardly from the second end of the second pipe outer surface, at least a portion of the second flange defining an outwardly flared outer surface. An annular fluid seal is between and abuts the first flange inner surface at a first seal outer surface portion and the second flange at a second seal outer surface portion and abuts the second pipe outer cylindrical surface adjacent to the second flange in a third seal outer surface portion.

An annular band clamp is attached to and abuts the first and second flanges at their respective outwardly flared outer surfaces for securing the first and second pipes in exhaust gas sealing relationship, the clamp having a clamp surface engaged with and corresponding to a respective different flange outer surface of the first and second flanges, the first flange outer surface engaged with a clamp surface and the first flange inner surface engaged with the seal first surface portion, each engagement being arranged to abut substantially only at a corresponding tangential point forming a pair of tangential points, the pair of tangential points defining a plane substantially normal to the engaged first flange surfaces and engaged seal surface portion at their tangential points.

In a further embodiment, at least one of the engaged clamp surface and first flange outer surface is arcuate and the engaged seal first surface portion and first flange inner surface is arcuate.

In a further embodiment, the seal engaged first surface portion is spherical.

In a further embodiment, the engaged first flange inner surface and seal first surface portion are annular and spherical and having different radii with the flange inner surface radius being larger than the seal first surface portion radius.

In a further embodiment, the second flange is approximately U-shaped with first and second flange legs extending outwardly from the second pipe outer surface, the first flange leg being defined by the outwardly flared outer surface portion, the second flange leg being substantially normal to the second pipe outer surface and facing toward the end edge of the second pipe forming an annular enclosed right angle corner surface with a second pipe outer surface portion terminating at the second pipe end edge, the seal having surface portions that mate with and engage the second leg and second pipe outer surface portion and corner surface.

In a further embodiment, the clamp is U-shaped and comprises first and second clamp legs, the first clamp leg having a clamp surface that is engaged with the first flange outer surface and the second clamp leg has a clamp surface that is engaged with the second flange outer surface, the engaged clamp surface of the first clamp leg being one of conical, arcuate and/or convex.

In a further embodiment, the first flange outer surface is arcuate and convex.

In a further embodiment, the first flange outer surface is convex and spherical.

In a further embodiment, the seal is wire mesh.

In a further embodiment, the first flange outer and inner surfaces are spherical, the outer surface being convex and the inner surface being concave.

In a further embodiment, the second flange is secured to the second pipe outer surface forming an acute angle enclosed corner with the second pipe outer surface, the second flange have spherical outer and inner surfaces, the seal having a first outer spherical surface portion abutting the first flange inner surface and a second outer spherical surface portion abutting the second flange inner surface and wedged in the enclosed corner by the clamp.

In a further embodiment, the clamp surfaces engaged with the outer surfaces of the first and second flanges are arcuate.

In a further embodiment, the clamp surfaces engaged with the outer surfaces of the first and second flanges is circular cylindrical.

In a further embodiment, the clamp is U-shaped with first and second legs, each leg having an arcuate surface for engaging the corresponding flange surface.

In a further embodiment, the clamp has first and second legs wherein the first leg engages the first flange outer surface and the second leg engages the second flange outer surface, the second leg being conical and the first leg being arcuate.

In a further embodiment, the first and second flanges have spherical inner and outer surfaces.

In still further embodiments, other arrangements are provided according to the present invention.

IN THE DRAWING

Figure 1:
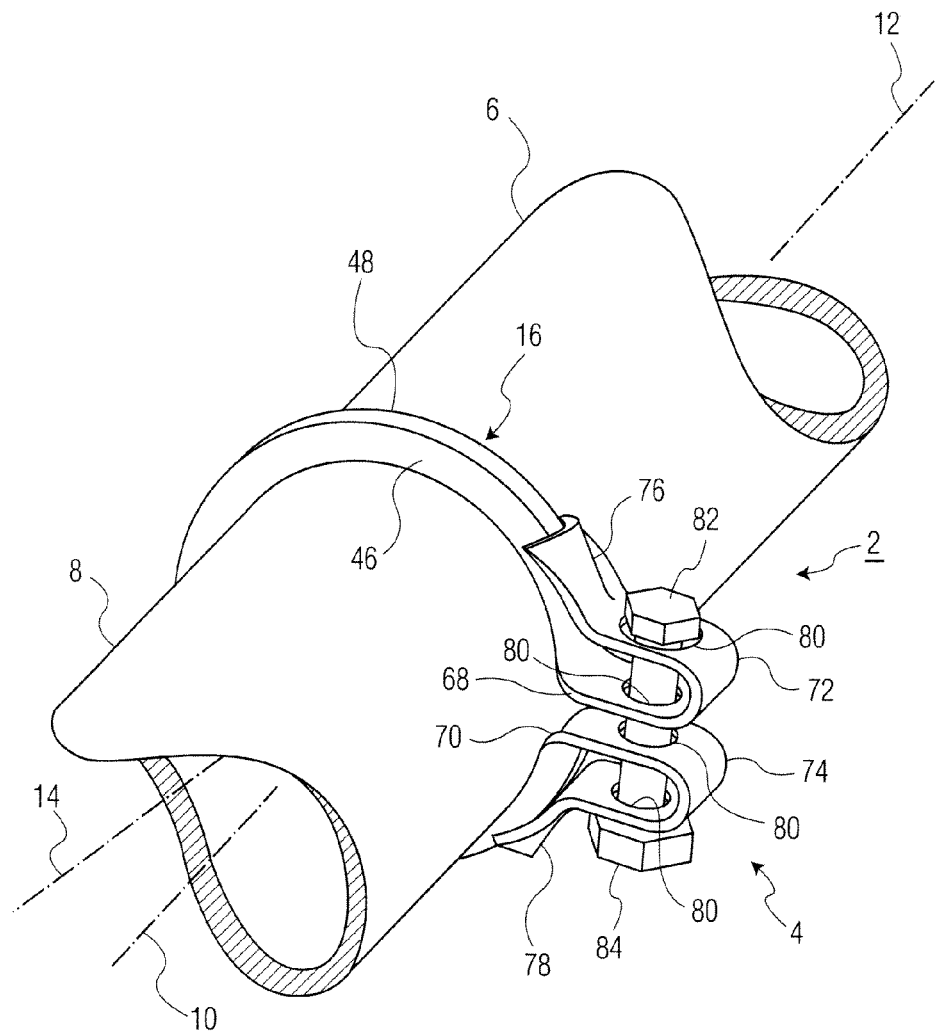
FIG. 1 is an isometric view of a joint and seal according to one embodiment of the present invention.

In FIG. 1, joint assembly 2 according to a first embodiment of the present invention, is particularly adapted for use with automotive exhaust systems. The assembly may be employed in other fluid distribution systems in which it is desired that one pipe be joined fixed with respect to a second pipe in the system. The assembly 2, FIG. 1, comprises a fixed rigid joint 4 for sealingly attaching a first circular cylindrical, preferably stainless steel, pipe 6 to a second circular cylindrical, preferably stainless steel, pipe 8. Pipes 6 and 8 are conventional for use in automotive exhaust systems for conveying hot toxic combustion engine exhaust gases. The two pipes 6 and 8 are joined by a so called band clamp 16 as described in the introductory portion. As will be shown below herein, the clamp 16 clamps the pipes to a seal via flanges attached to the pipes to form a gas tight seal while at the same time permitting the longitudinal axes of the pipes to be orientated at an angle to each other and not only coincident, not generally possible with prior art band clamp automotive exhaust pipe joints.

Figure 2:
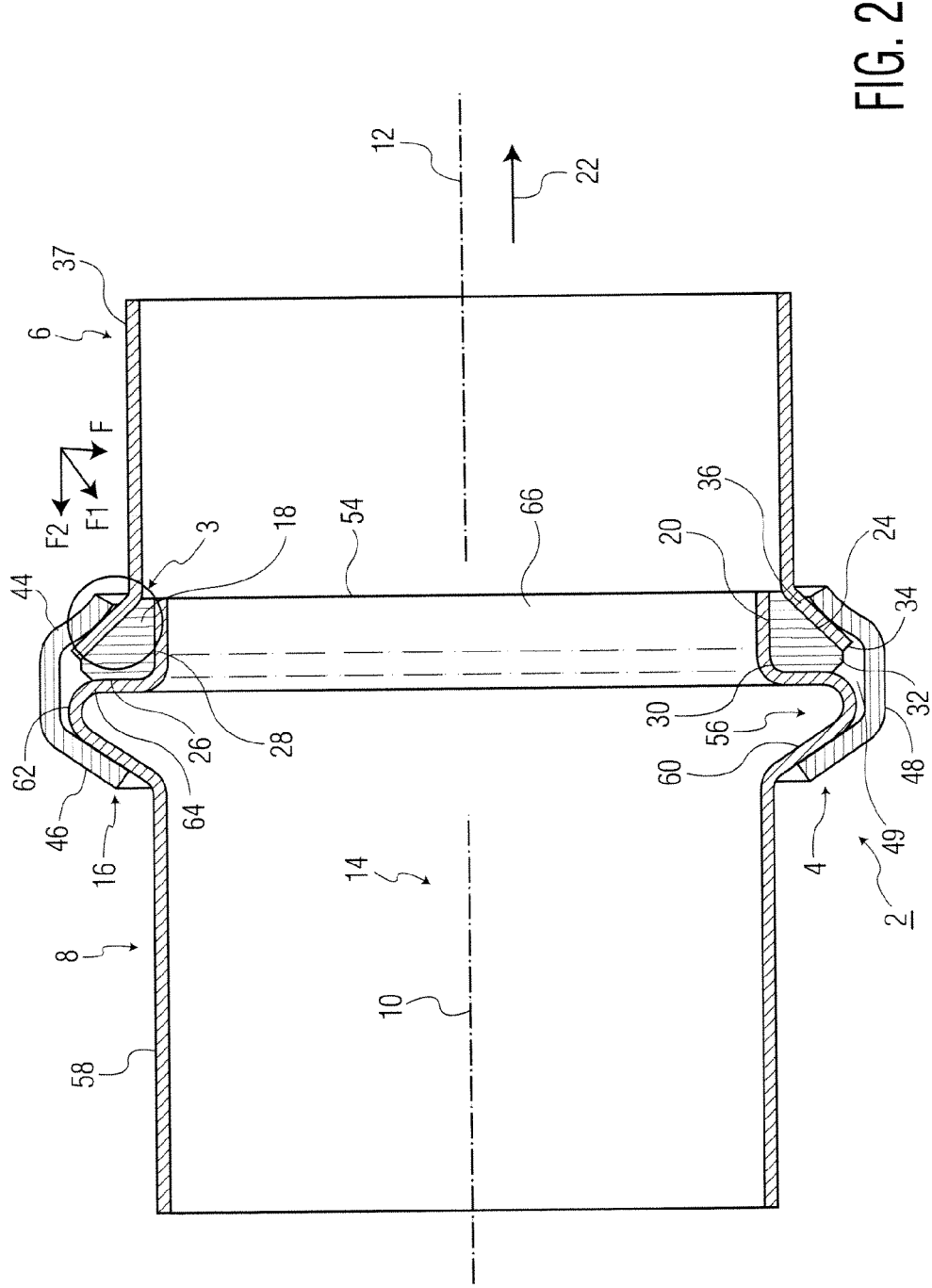
FIG. 2 is a sectional elevation view of the joint of FIG. 1.

In a band clamped exhaust system joint, the joint must be essentially leak proof, while not permitting any relative motion of the pipes to one another. Normally the pipes need to have their respective axes coincident. This is not always possible in a practical automotive assembly line. The pipe 6 has a longitudinal axis 10 and the pipe 8 has a longitudinal axis 12. During assembly, the axes 10 and 12 may not be coincident with each other, and may be oriented at an angle relative to each other as represented by imaginary axis 14, FIGS. 1 and 2, representing the relative angular orientation of pipe 8 to pipe 6 as they are being attached. It is important that the pipes be capable of being joined in leak proof relation while accepting the pipes in such various angular relative orientations.

Leaking exhaust gases may undesirably seep into the vehicle passenger cabin, especially if the vehicle is stationary. If the joint is prior to the catalytic converter, untreated exhaust gas may escape. Under certain operating conditions, air can be drawn into the joint by a lower pressure within the joint. In sophisticated systems, an oxygen sensor senses the oxygen content of the exhaust gas in the exhaust pipes. If air is drawn into the joint via a leak, the sensor may sense an erroneous lean condition. A computer in response may cause a richer mixture of fuel-air to be supplied to the engine, resulting in higher undesirable emissions and poorer fuel economy. The joint and seal of the present invention minimizes such leaks.

In FIG. 2, in a first embodiment of the present invention, seal 18 is preferably formed with a reinforcing matrix of a knitted wire mesh, which may be stainless steel and comprising wire of a diameter determined by a given implementation, a filler material which may be vermiculite or mica and a lubricant such as graphite. These materials may be combined according to a given implementation and may form a preform during a stage of fabrication of the seal. Examples of such preform materials are disclosed in U.S. Pat. Nos. 5,499,825 and 5,040,805, incorporated by reference herein. Also, disclosed in these patents are techniques for forming preforms for use in an automotive exhaust joint arrangement using seals of the type disclosed therein.

The resulting preform, generally planar, is flexible and wrapped about a mandrel to form a cylindrical structure as shown for example in U.S. Pat. Nos. 5,499,825 and 5,040,805, incorporated in their entirety by reference herein. For example, in U.S. Pat. No. 5,499,825, a knitted wire net of stainless steel fine wire is combined with a sheet of heat resistant material such as expanded graphite, mica or asbestos. A lubricating composition is then coated on the sheet material which is placed within the knitted wire mesh. This structure is then wrapped about a mandrel in a female die of cylindrical shape. A male cylindrical die is inserted into the female die compressing the preform material in the female die, forming the preform into the desired seal configuration.

Other forms of the composite material may include powder matrices added to the female die after the wire mesh is wrapped about a core in the female die. This powder matrix material tends to be external the wire mesh in the formed seal. The combination of materials is then compressed with a male die to form the seal.

In U.S. Pat. No. 5,040,805, a knitted wire mesh is wound about a core. An expanded graphite sheet is disposed over the uncoiled wire mesh. Both are wound cylindrically in succession on a partial cylindrical part and a preform body with a refractory material projecting on an end portion of the preform body is formed. Depending upon the wire mesh parameters, e.g., wire size and knit loop spacing, and the filler material, the resulting seal can be compliant or relatively rigid.

In one form, the lubricant may be a graphite sheet material wrapped about the wire mesh preform. In a further embodiment, a powder composite, a lubricating material such as graphite and the wire mesh are placed in the female die. When compressed, the resultant structure is relatively hard and rigid. The lubricating material is placed to form a lubricating surface on the seal for dynamic action with a mating flange surface.

The seal 18 is circular, with a triangular cross section as shown, and having a central through bore 20 extending in axial direction 22. The seal 18, FIG. 3, has an outer annular convex spherical surface portion 24. The seal outer convex surface portion 24 has a radius $R_2$, FIG. 3, of a given magnitude. The seal 18, FIG. 2, has two surface portions 26, 28 at right angles to one another joined by a rounded corner portion at edge 30. The surface 28 is circular cylindrical and defines the through bore 20. The top corner edge 32 of the seal that joins surface portions 24 and 26 is also rounded. The relative magnitudes of the radii are not to scale.

Figure 3:
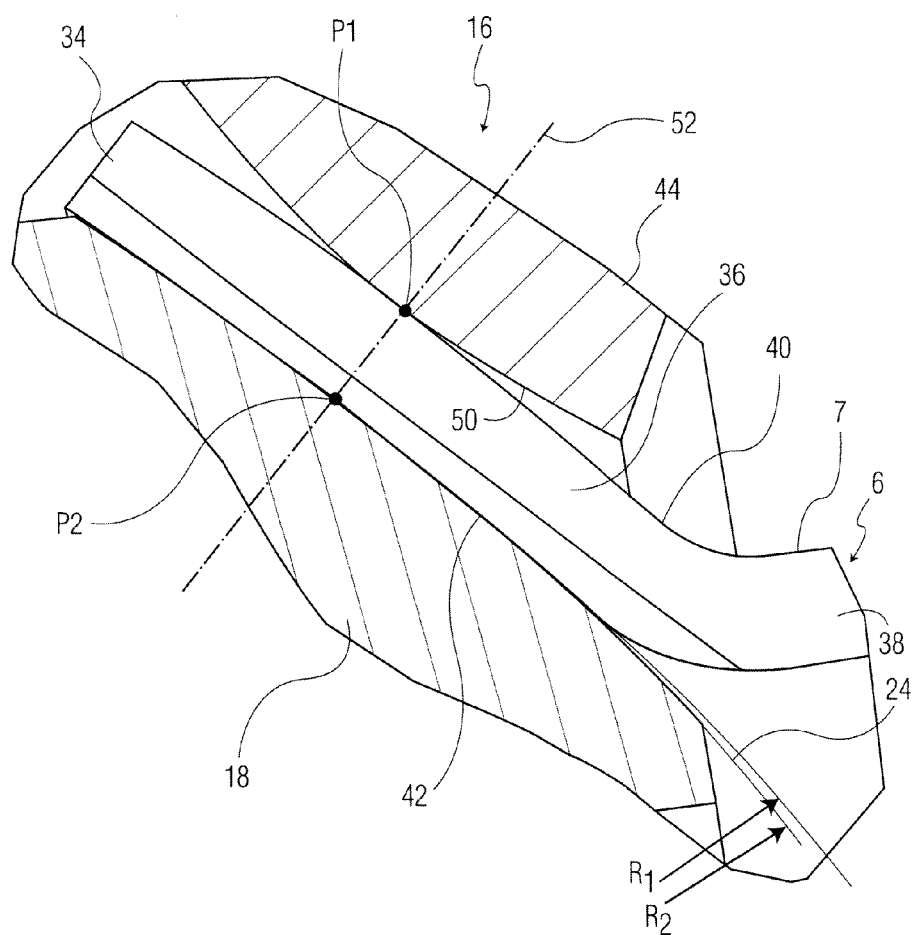
FIG. 3 is a more detailed view of the joint of FIG. 2 taken at region 3.

Pipe 6, as best seen in FIG. 3, has a first end that terminates at end edge 34. The pipe 6 has a flange portion 36 at the first end which extends flared outwardly from the pipe 6 cylindrical portion 38 outer surface 37 relative to the pipe 6 axis 12 (FIG. 2) in a somewhat conical format to the edge 34. The flange portion 36, however, is not a true cone as it is convex spherical at its outer surface 40 and concave spherical at its inner surface 42. The portion 36 inner and outer spherical surfaces 40, 42 are concentric. The inner concave spherical surface 42 of the flange 36 has a radius $R_1$ which is larger than radius $R_2$ of the seal outer surface 24. This difference in radii relationship provides tangential point contact P2 of the inner concave spherical surface 42 of the flange portion 36 to the outer convex spherical surface 24 of the seal 18 when these surface engage as shown in FIGS. 2 and 3.

In FIG. 2, the band clamp 16 has two radially inwardly extending but outwardly flared legs 44 and 46 inclined at about 45° relative to central member 48. The central member 48 is circular cylindrical forming the clamp into a somewhat U-shaped member in cross section having a radially inwardly facing channel 49. The legs 44 and 46 are each inclined generally at about the same angle radially inwardly and outwardly from the member 48. The leg 46 is frusto-conical. The leg 44 is generally also frusto-conical, but curved with a curved convex surface 50, FIG. 3, facing and contiguous with the flange portion 36 outer convex spherical surface 40. The surfaces 40 and 50 of the respective flange portion 36 and leg 44 abut substantially in a tangential point P1, at least initially, notwithstanding compressive forces which may distort these surfaces somewhat and flatten or even bend them somewhat.

The two tangential points P1 and P2 define a plane 52. This plane 52 is substantially normal to the respective surface 50 of the clamp leg 44 and the flange portion 36 outer spherical surface 40 forming point P1 and the inner concave spherical surface 42 of the flange portion 36 and the outer spherical surface 24 of the seal 18 forming point P2.

In FIG. 2, the pipe 8 terminates at one end thereof at edge 54. A flange 56 extends radially outwardly from the pipe 8 outer surface 58. The flange 56 has an outwardly flared portion 60 which is conical and inclined relative to axis 10. The portion 60 terminates an upper rounded section 62. A further flange portion 64 of flange 56 depends radially downwardly and perpendicular toward the pipe 8 outer surface 58 between the flange 56 and end edge 54. The corner between the flange portion 64 and the pipe 8 outer surface is rounded and enclosed. The pipe 8 thus has an end circular cylindrical segment 66 between the end edge 54 and the flange 56. The flange portion 64 is thus normal to the pipe 8 segment 66 outer surface.

In FIG. 2, the seal corner surface portions 26 and 28 abut the flange portion 64 surface and the pipe 8 outer surface 58 at seal segment 66. The clamp leg 46, being conical, as is the flange portion 60 of the flange 56, abut substantially over their entire surfaces.

In FIG. 1, the band clamp 16 comprises a split ring formed by central connecting member 48 and legs 44 and 46. The ring is open at ends 68 and 70 of the member 48 and legs. The legs 44, 46 and member 48 are flattened and bent into respective end lugs 72 and 74 at ends 68, 70. The lugs 72 and 74 are secured to the member 48 and legs 44 and 46, e.g., welded or bonded etc. The lugs 72, 74 have apertures 80 that are aligned and receive a bolt 82. A nut 84 is attached to the bolt 82 to provide the clamping forces.

In operation, In FIG. 1, the band clamp is attached to the flanges of the adjacent pipes 6 and 8 to be joined in fluid tight sealing relationship. In practice, the pipes when attached may not have their respective axes coincident and misaligned at an angle as represented by axis 14, FIGS. 1 and 2. The flange 36 of pipe 6 and the mating seal surface portion 24 of the seal 18, being spherical, permit rotational alignment of the attached pipe 6 axis 12 to the pipe 8 axis 10 during fixation of the clamp 16 to the pipes and the pipes to each other.

As shown in FIG. 3, for example, the convex curved contact surface of the clamp leg 44 to the convex spherical contact surface 40 of the flange 36 of pipe 6 being convex to convex, easily permits rotational attachment of the pipe flange 36 to the clamp leg 44. Similarly, the concave spherical inner surface 42 of the flange 36 and the mating convex spherical outer surface 24 of the seal 18 also permit rotational attachment of the pipe 6 to the seal 18.

The bolt 82, FIG. 1 is tightened via nut 84 shrinking the inner diameter of the clamp in a known manner causing the legs 44 and 46 to be compressed against the respective flared flange 36 of pipe 6 and the flared flange portion 60 of the flange 56 of pipe 8. As the leg 44, FIG. 2, is squeezed radially inwardly, it exerts a force F radially inwardly on the flange 36. This force creates an inclined force component F1 in the plane 52, FIG. 3, on the flange 36 and seal 18 at the tangential points P1 and P2 defining the plane 52.

The forces in the plane 52 thus are aligned in this plane and are a maximum as they are transferred to the seal 18 from the flange 36 and then to pipe 8 and its flange. There may be some deformation of the flange 36 and/or seal 18 during this action, which deformation may be a bending or other distortion of the flange or compression of the seal, which further bending or compression further concentrates the force F1 onto the seal 18 outer spherical surface 24. This force F1 also forces the seal 18 into the corner defined by the perpendicular flange portion 64 of flange 56 and the outer surface of the pipe 8 in segment 66. These compressive force actions form a tight seal between the seal and mating surfaces by concentrating the forces in the plane 52 as compared to spreading the forces over relatively larger areas as occurs in the prior art joints. Thus for a given compressive force exerted by the clamp, much higher forces are exerted onto the seal and mating surfaces than otherwise might occur.

The force F also has a horizontal axial component F2 and a complementary force component on the leg 46 of the flange 56 in the opposite direction as component F2, forcing the flanges 36 and 56 together toward one another in fixed sealing engagement with the seal 18.

The tangential points P1 and P2 is important. They define a plane in which the clamp exerts compressive stress concentration and transmission of the sealing forces from the clamp to the seal and between the seal and the pipe 8 and flange 56, the plane defined by the points P1 and P2 being normal to the involved surfaces at these points. This concentration of forces provides an enhanced sealing action in response to a given compressive load exerted between the flanges 36, 56 and the seal 18 by the band clamp. The concentrated load provides tighter sealing action as compared to the compressive load spread over an area of the seal and mating flange as in the prior art. Thus, the compressive loads at points P1 and P2 provide stress concentration to enhance the sealing action not otherwise provided in prior art seals having sealing loads spread over an area defined by mating surfaces whether they be convex and concave. This stress concentration not only enhances the sealing action, it also helps reduce noise and wear on the seal. These tangential points are provided by the different radii of the mating convex and concave spherical or arcuate surfaces of the clamp, flanges and seal or by providing convex to convex mating surfaces as shown in FIGS. 2 and 3. These tangential points define a plane that passes through the mating contact surfaces of the various elements at points P1 and P2.

In operation, assume the gas flows into pipe 6 and then into pipe 8 in a direction opposite direction 22. The exhaust gas flows through the pipes 6 and 8 at the seal 18 junctions therebetween. The gas can not flow between the pipe 8 outer surface 58 and the flange 36 of the pipe 6 to the ambient atmosphere due to the presence of the seal 18. This is because of the compression forces on the seal 18 at its interfaces with the pipe 8, flange portion 64 of 56, and the flange 36. The gas has no other paths to follow.

Figure 4:
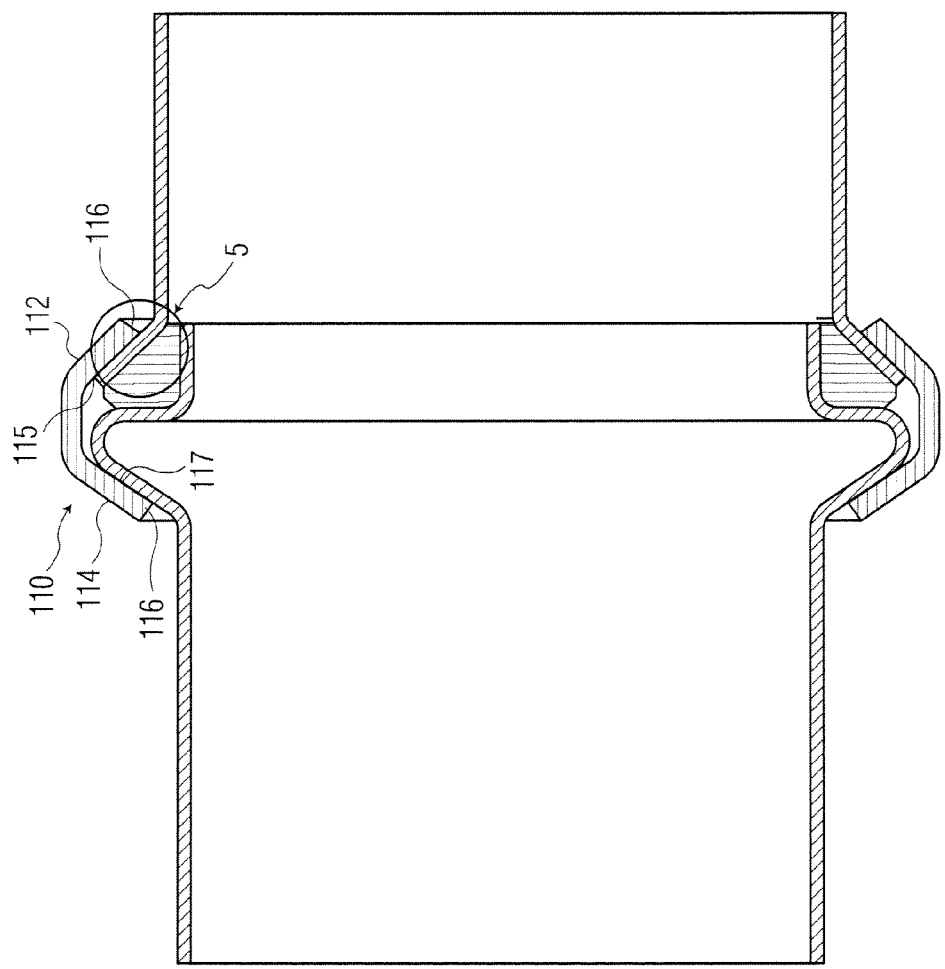
FIG. 4 is a sectional elevation view of a joint and seal according to a second embodiment of the present invention.
Figure 5:
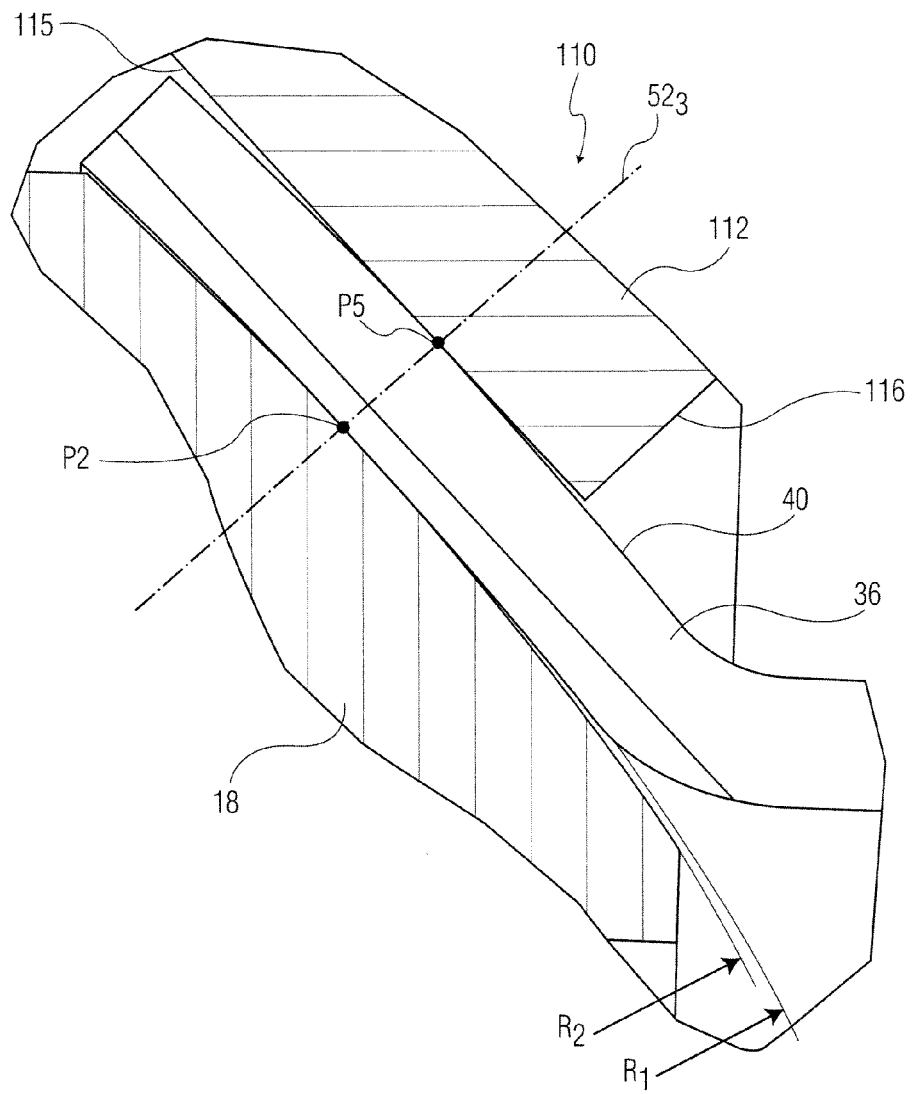
FIG. 5 is a more detailed view of the joint of FIG. 4 taken at region 5.

FIGS. 4 and 5 disclose a second embodiment that differs from that of FIGS. 2-3 in that the clamp 110 differs from clamp of FIGS. 2-3, wherein the clamp 110 is similar to the clamp 16 of FIGS. 1 and 2, but the leg 112 of clamp 110 is different than leg 44 of the embodiment of the clamp 16 of FIGS. 1-3 Clamp 110 has two frusto-conical axially outwardly and radially inwardly flared legs 112 and 114. Leg 114 is identical to leg 46 of the embodiment of FIG. 2. The legs 112 and 114 each have rectangular in section tips 116. The side surfaces 115 and 117 of the respective legs 112 and 114 engage the respective corresponding flange surfaces rather than the leg tips. Plane $52_3$ is defined by tangent point P5 of the inner surface 115 of leg 112 with the flange 36 outer convex spherical surface and P2, FIG. 5. All of the other structures of FIGS. 4 and 5 are the same as the embodiment of FIGS. 2-3.

In this embodiment, the outer surface 40 of the flange 36 being convex spherical, mates with the planar inner side surface 115 of leg 112 at tangential point P5. Points P5 and P2 define plane $52_3$. This plane is normal to the mating surfaces at the points P2 and P5 in a manner similar to that as described above for the other embodiment of FIGS. 2-3.

Figure 6:
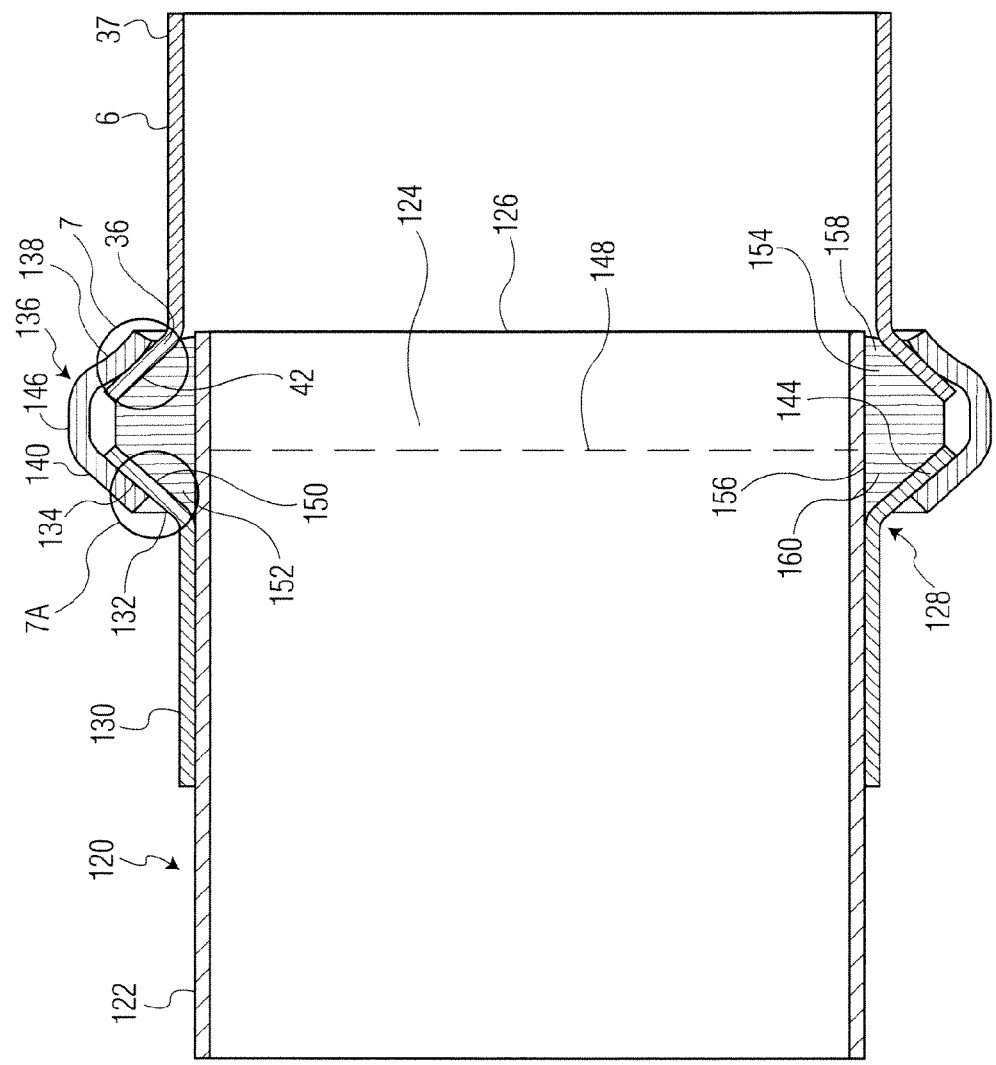
FIG. 6 is a sectional elevation view of a joint and seal according to a third embodiment of the present invention.
Figure 7:
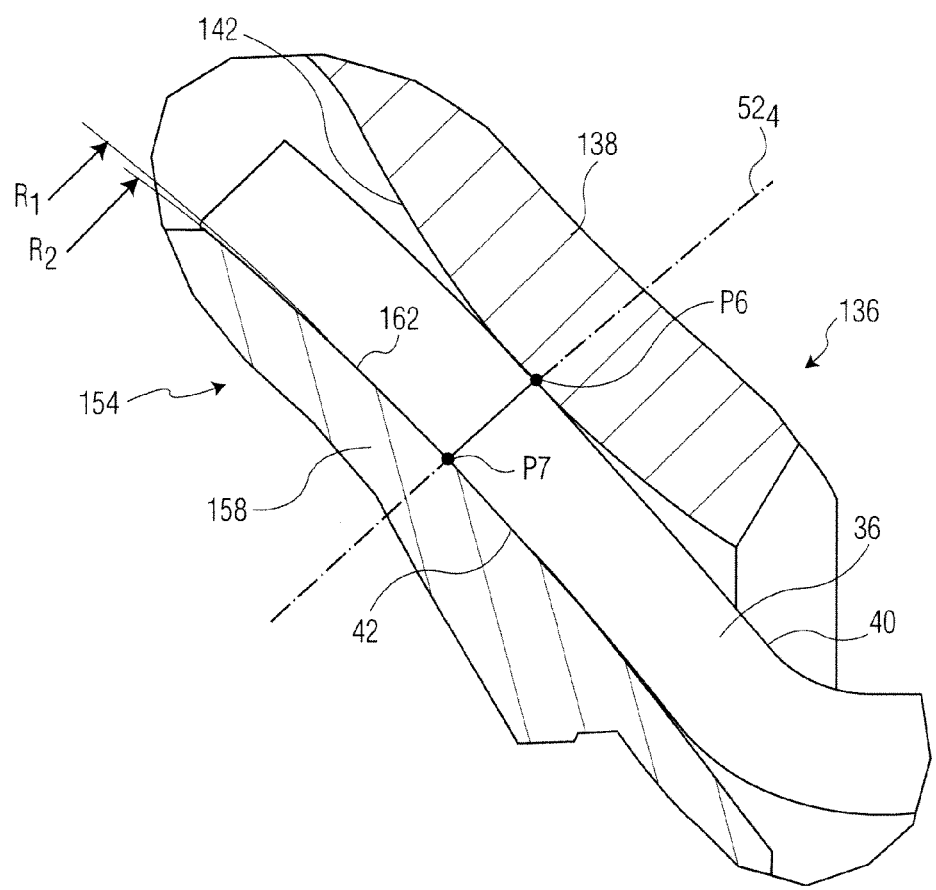
FIGS. 7 and 7A are more detailed views of the joint of FIG. 6 taken at respective regions 7 and 7A.

FIGS. 6 and 7 disclose a further embodiment wherein pipe 6 is identical to pipe 6 of FIGS. 2-5 and includes an identical flange 36 with spherical outer flange surface 40. Pipe 120 is different than pipe 8 of the prior embodiments. This pipe is also circular cylindrical with an outer cylindrical surface 122. Pipe 120 has an end 124 that terminates at edge 126, FIG. 6. Mounted on end 124, by welding or other permanent heat and hot exhaust gas resistant attachment arrangement, is flange member 128 which comprises a circular cylindrical portion 130 that mounts on, is concentric with, welded to (by welds not shown) and contiguous with the pipe 120 outer surface 122. The portion 130 has a flange 132 that is flared radially upwardly and axially toward a plane defined by the edge 126 of pipe 120 (and toward the flange 36 when the two pipes 6 and 120 are joined as shown). The flange 132 preferably is a mirror image of flange 36 and has a convex spherical outer surface 134 preferably identical to the outer surface 40 of flange 36. The flange 132 and pipe 120 outer surface 122 juxtaposed with the flange 132 inner surface 150 define an enclosed wedge shaped annular recess 152.

A band clamp 136 clamps the two pipes 6 and 120 via their flared flanges 36 and 132. Clamp 136 is constructed substantially similar to the band clamp 16 of FIGS. 2 and 3 in that it has a curved leg 138 and a frusto-conical leg 140. Leg 138 is constructed similar to leg 44 of clamp 16, FIGS. 2 and 3, in that it has a curved convex inner surface 142, FIG. 7. The leg 140 is similar to leg 46 of clamp 16 in that leg 140 is frusto-conical with a frusto-conical inner surface 144. The band clamp 136 has a substantially circular cylindrical central member 146 from which the legs 138 and 140 depend in their axially outwardly and radially inwardly flared configuration. The clamp 136, as do the other clamps of the prior discussed embodiments, define an annular inner channel that receives the flanges 36 and 140 of the two pipes being joined as shown in FIG. 6. The flange 132 terminates at edge 148 and overlies a portion of the pipe 120 outer surface 122 forming the recess 152.

A seal 154 has a circular cylindrical bore 156. The seal has two mirror edge sections 158 and 160. The seal sections 158 and 160, FIGS. 7 and 7A, each have a corresponding respective convex spherical outer surface 162 and 164 preferably of the same radius value, i.e., radius R2, FIG. 7, and radius R4, FIG. 7A. Radii R2 and R4, being preferably of the same value, are smaller than radius R1 of the flange 36, FIG. 11, and radius R3 of the flange 132, R1 and R3 also may be the same value FIG. 7A.

Because the contact surface of the clamp leg 138, FIG. 7, is convex as is the contact surface of the outer surface 40 of flange 36, these surfaces engage at a tangential contact point P6. The concave spherical inner surface 42 of flange 36 engages the convex outer spherical surface 164 of seal 154 at tangential contact point P7. Points P6 and P7 define a plane $52_4$. This plane is normal to the surfaces of the clamp leg 138, flange 40 and seal 154 at their respect tangential points of contact engagement providing increased stress and force concentration at these points along the plane defined thereby.

Figure 7A:
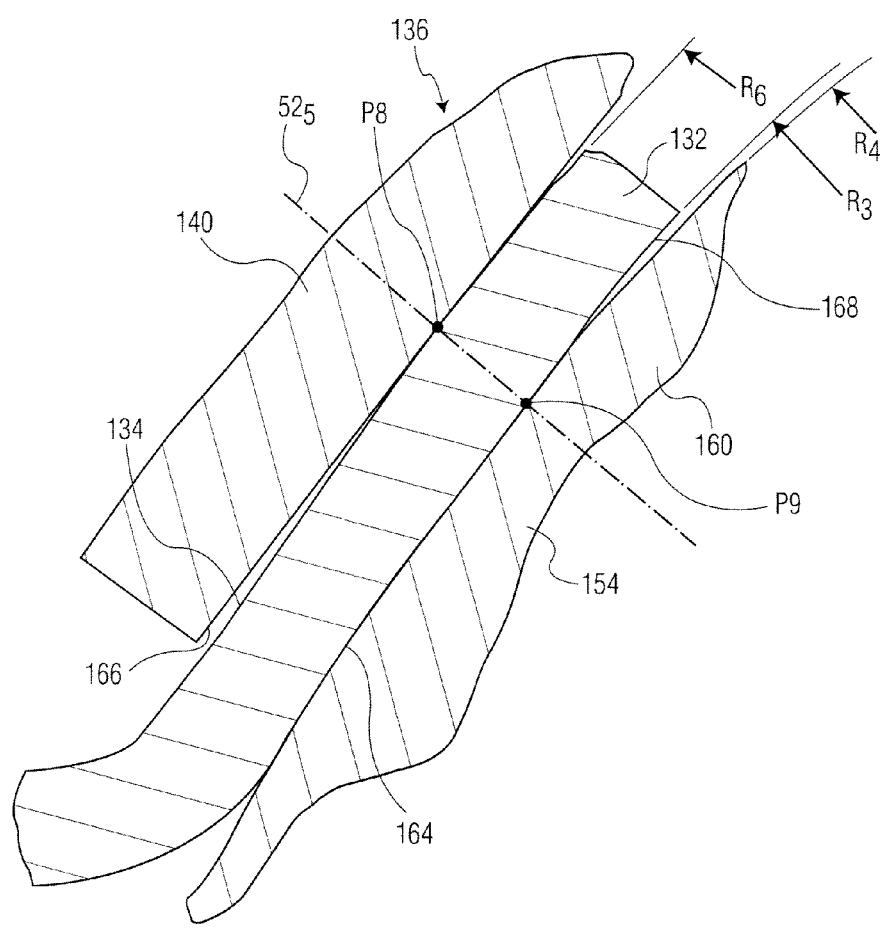

The clamp leg 140 of clamp 136, FIG. 7A, inner frusto-conical surface 166 engages the outer spherical convex surface of flange 132 of pipe 120 at tangential point P8. The inner concave spherical surface 168 of flange 132 engages the outer convex spherical surface 170 of seal 154 at tangential point P9. Points P8 and P9 define a plane $52_5$. This plane is normal to the surfaces of the clamp leg 140, flange 132 and seal 154 at their respect tangential points of contact engagement. The clamp 136, and the other clamps described so far, provides stress concentration of clamping forces on the seal and adjacent contiguous surfaces similar to those forces corresponding to the forces F, F1 and F2 described in connection with FIG. 2.

In FIG. 6, the band clamp 136 forces the two flanges 36 and 132 together axially against the seal 154 mating spherical surfaces in tangential relationship and also radially compresses against the flanges 36 and 132 and in turn compresses the flanges against the seal 154 and the seal against the pipe 120 outer surface 122. This action also wedges the seal 154 into the closed recess 152 at pipe 120 providing further enhanced sealing forces and action. A wedging action also occurs in forcing the seal 154 into the recess formed by flange 36 and the juxtaposed pipe 120 outer surface 122, FIG. 6. The flanges 36 and 132 both are juxtaposed with the pipe 120 outer surface 122 wedging the seal against both flanges and the pipe 120 outer surface providing enhanced sealing action. This embodiment thus provides increased sealing action as compared to the prior described embodiments due to the added stress concentration and wedging action at the flange 132.

Figure 8:
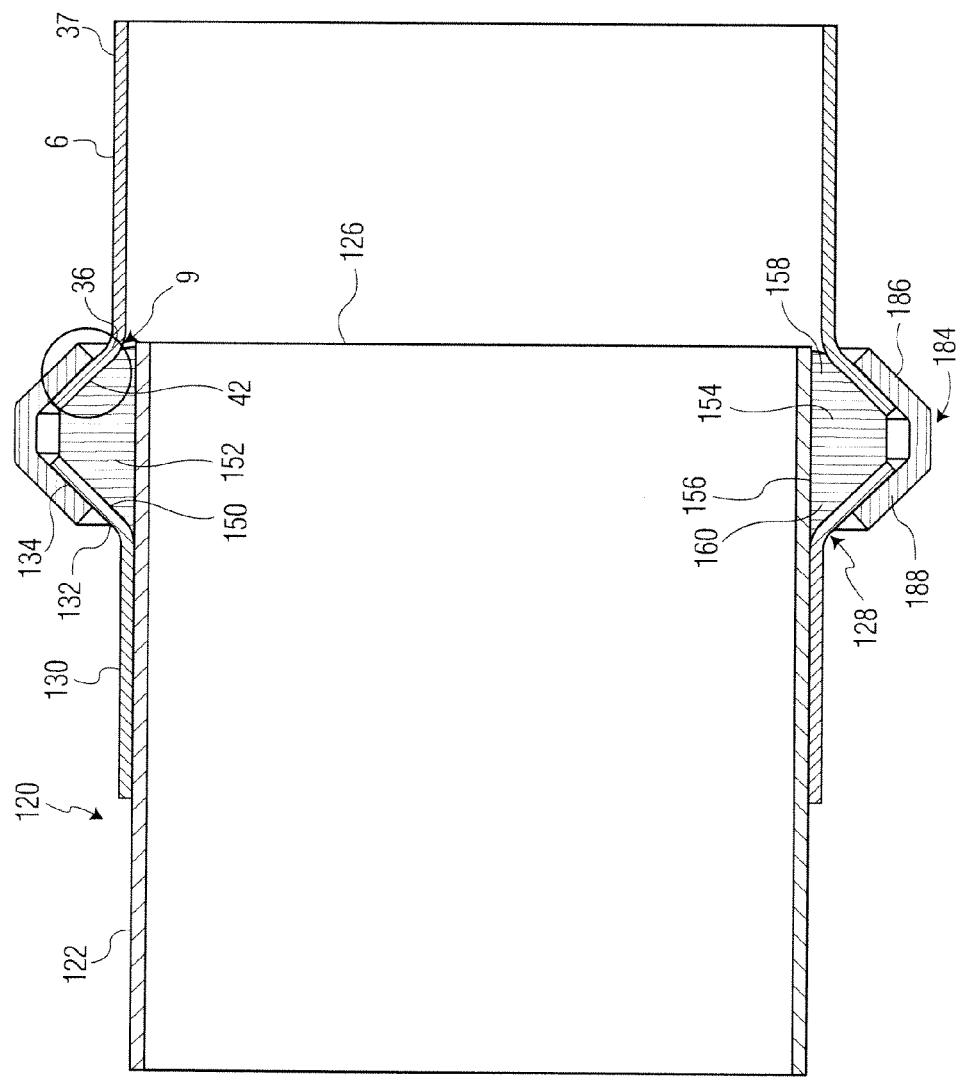
FIG. 8 is a sectional elevation view of a joint and seal according to a fourth embodiment of the present invention.

FIG. 8 illustrates a further embodiment which is similar to that of FIG. 10 wherein only the band clamp 184 is different from the band clamp of FIG. 10, all other structures including the pipe 6, flange 36, pipe 120 and flange 132 being identical. The band clamp 184 is similar to the band clamp 110 of FIG. 4 in that the legs 186, 188 of clamp 184 are both frusto-conical with rectangular leg end edges that are not arcuate.

Figure 9:
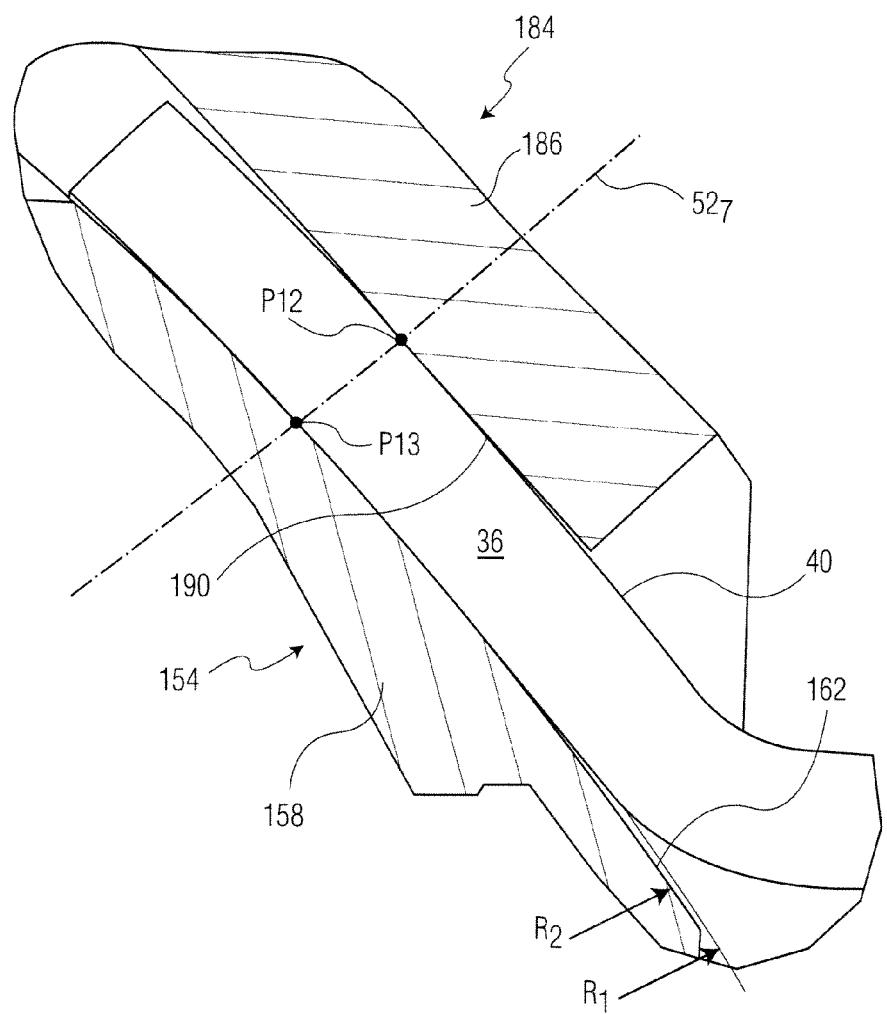
FIG. 9 is a more detailed view of the joint of FIG. 8 taken at region 9.

The relatively flat inner surfaces of the frusto-conical legs 186 and 188 engage the spherical outer surfaces of the respective flanges 36 and 132 (FIG. 8) at corresponding tangential points. The leg 186 inner flat surface 190, FIG. 9, engages the convex spherical outer surface 40 of the flange 36 at tangential point P12. The flange 36 convex spherical inner surface 42 engages the seal 154 outer convex spherical surface 162. The surface 42 has a relatively larger radius R1 as compared to the radius R3 of the convex spherical surface of the seal 154 engaged therewith to form the tangential engagement point P13 of these surfaces. Tangential points P12 and P13 define a plane $52_7$. Plane $52_7$ is normal to the surfaces of the flange 36, leg 186 and seal 154 at the engagement points P12 and P13 as in the prior embodiments discussed above. The flat inner surface of the other leg 188 of the clamp 184 engages the flange 132 outer convex spherical surface in a tangential point (not identified in the figures) similar to point P12, FIG. 9, in mirror image relation thereto. The flange 132 engages the outer convex spherical surface of the section 160 of the seal 154 in a tangential point similar to point P13 in mirror image fashion thereto. The tangential points at leg 188, flange 132 and seal 154 are somewhat similar to and correspond to the points P8 and P9 and plane $52_5$ of the embodiment of FIG. 7A.

The relatively flat inner surfaces of the frusto-conical legs 186 and 188 engage the spherical outer surfaces of the respective flanges 36 and 132 (FIG. 8) at corresponding tangential points. The leg 186 inner flat surface 190, FIG. 9, engages the convex spherical outer surface 40 of the flange 36 at tangential point P12. The flange 36 convex spherical inner surface 42 engages the seal 154 outer convex spherical surface 162. The surface 42 has a relatively larger radius R1 as compared to the radius R3 of the convex spherical surface of the seal 154 engaged therewith to form the tangential engagement point P13 of these surfaces. Tangential points P12 and P13 define a plane $52_7$. Plane $52_7$ is normal to the surfaces of the flange 36, leg 186 and seal 154 at the engagement points P12 and P13 as in the prior embodiments discussed above. The flat inner surface of the other leg 188 of the clamp 184 engages the flange 132 outer convex spherical surface in a tangential point (not identified in the figures) similar to point P12, FIG. 9, in mirror image relation thereto. The flange 132 engages the outer convex spherical surface of the section 160 of the seal 154 in a tangential point similar to point P13 in mirror image fashion thereto. The tangential points at leg 188, flange 132 and seal 154 are somewhat similar to and correspond to the points P8 and P9 and plane $52_5$ of the embodiment of FIG. 7A.

As can be observed, in all cases of the disclosed embodiments herein, the tangential engagements are 1) between a convex arcuate surface against a convex arcuate surface, 2) a convex arcuate surface against a concave arcuate surface of different radii wherein the convex surface has a smaller radius than that of the concave surface or 3) a planar surface against a convex surface. Also all planes defined by the tangential points between a clamp leg and flange and between the flange and the seal are substantially normal to the surfaces at the engaged tangential points notwithstanding there may be some deformation at these tangential points.

It will occur to one of ordinary skill that modifications may be made to the disclosed embodiments. What is important is that the mating surfaces of the clamp contact surface on the flange may be flat as in a conical clamp leg, or arcuate and the contact surfaces of the pipe flanges outer and inner surfaces and the seal surfaces mating with the flanges be arcuate, and preferably spherical in certain of the embodiments as described. Where the mating surfaces are generally complementary concave and convex, they preferably have different radii defining a tangential contact engagement point between the surfaces. An engaged at least one leg of the band clamp may be arcuate as is the mating outer engaged surface of one of the flanges of the two pipes being joined. In the alternative, that one leg or outer surface of the flange may be planar if the other is arcuate to form an tangential point of engagement. The engaged flange and seal also form a tangential point of engagement so that the two points of engagement of the leg to flange and flange to seal define a plane that is normal to the engages surfaces at their engaged tangential points. That plane, being normal to the contact interfaces at corresponding interface points, provides pressure concentration at the plane substantially perpendicular to the surfaces at the interface points.

While the seals are preferably formed of knitted wire mesh, they may be formed as solid metal structures, e.g., powdered composite without a mesh reinforcement. Also, the seals may be forged, machined, cast or otherwise formed. The mesh may or may not be knitted. The reinforcement may be made of non-metallic materials. It is intended that the scope of the invention be defined by the appended claims, the description herein being given by way of illustration and not limitation.

What is claimed is:

1. An automotive exhaust pipe joint and seal arrangement for fixedly joining two adjacent exhaust pipes in exhaust gas sealed relation to each other comprising:
   first and second exhaust pipes each defining a longitudinal axis and having respective corresponding adjacent first and second ends, each pipe having an outer cylindrical surface and an end edge;
   an annular first flange having opposing inner and outer surfaces, the flange being outwardly flared from the first end of the first pipe outer surface;
   an annular second flange extending radially outwardly from the second end of the second pipe outer surface, at least a portion of the second flange defining an outwardly flared outer surface;
   an annular fluid seal between and abutting the first flange inner surface at a first seal outer surface portion and the second flange at a second seal outer surface portion and abutting the second pipe outer cylindrical surface adjacent to the second flange in a third seal outer surface portion; and
   an annular band clamp attached to and abutting the first and second flanges at their respective outwardly flared outer surfaces for securing the first and second pipes in exhaust gas sealing relationship;
   the clamp having a clamp surface engaged with and corresponding to a respective different flange outer surface of the first and second flanges, the first flange outer surface engaged with a clamp surface and the first flange inner surface engaged with the seal first outer surface portion, each engagement being arranged to abut substantially only at a corresponding tangential point forming a pair of tangential points, the pair of tangential points defining a plane substantially normal to the engaged first flange surfaces and engaged seal first outer surface portion at their points of tangency.

2. The joint and seal arrangement of claim 1 wherein at least one of the engaged clamp surface and first flange outer surface is arcuate and at least one of the engaged seal first outer surface portion and first flange inner surface is arcuate.

3. The joint and seal arrangement of claim 1 wherein the seal engaged first seal outer surface portion is spherical.

4. The joint and seal arrangement of claim 1 wherein the engaged first flange inner surface and the first seal outer first surface portion are annular and spherical and having different radii with the flange inner surface radius being larger than the seal first surface portion radius.

5. The joint and seal arrangement of claim 1 wherein the second flange is approximately U-shaped in cross section with first and second flange legs extending outwardly from the second pipe outer surface,
   the first flange leg being defined by the outwardly flared outer surface portion, the second flange leg being substantially normal to the second pipe outer surface and facing toward the end edge of the second pipe forming an annular enclosed right angle corner surface with a second pipe outer surface portion terminating at the second pipe end edge,
   the seal second and third surface portions mating with and engaged respectively with the second flange leg and second pipe outer surface portion.

6. The joint and seal arrangement of claim 1 wherein the clamp is U-shaped in cross section and comprises first and second clamp legs, the first clamp leg having a clamp surface that is engaged with the first flange outer surface and the second clamp leg has a clamp surface that is engaged with the second flange outer surface, the engaged clamp surface of the first clamp leg being one of conical, arcuate and convex.

7. The joint and seal arrangement of claim 1 wherein the first flange outer surface is arcuate and/or convex.

8. The joint and seal arrangement of claim 1 wherein the first flange outer surface is convex and spherical.

9. The joint and seal arrangement of claim 1 wherein the seal is wire mesh.

10. The joint and seal arrangement of claim 1 wherein the first flange outer and inner surfaces are spherical, the outer surface being convex and the inner surface being concave.

11. The joint and seal arrangement of claim 1 wherein the first flange outer and inner surfaces are arcuate.

12. The joint and seal arrangement of claim 1 wherein the second flange is welded to the second pipe outer surface forming an acute angle enclosed corner with the second pipe outer surface, the second flange have spherical outer and inner surfaces, the seal first outer surface portion abutting the first flange inner surface and a further outer spherical surface portion of the seal abutting the second flange inner surface and wedged in the enclosed corner by the clamp.

13. The joint of claim 1 wherein the clamp surfaces engaged with the outer surfaces of the first and second flanges are arcuate.

14. The joint and seal arrangement of claim 1 wherein the clamp surfaces engaged with the outer surfaces of the first and second flanges are circular cylindrical in cross section.

15. The joint and seal arrangement of claim 1 wherein the clamp is U shaped in cross section with first and second legs, at least one leg having an arcuate surface for engaging the corresponding flange surface.

16. The joint and seal arrangement of claim 1 wherein the clamp has first and second legs wherein the first leg engages the first flange outer surface and the second leg engages the second flange outer surface, the second leg being conical and the first leg being arcuate.

17. The joint and seal arrangement of claim 16 wherein the first and second flanges each have spherical inner and outer surfaces.

18. The joint and seal arrangement of claim 17 wherein the outer surfaces of the flanges are convex and their inner surfaces are concave.

19. The joint and seal arrangement of claim 1 wherein the second flange outer surface is engaged with a clamp surface and the second flange inner surface is engaged with the seal first surface portion, each engagement being arranged to abut substantially only at a corresponding tangential point, the tangential points defining a plane substantially normal to the engaged second flange surfaces and engaged seal second surface portion.

20. The joint and seal arrangement of claim 1 wherein the clamp has first and second legs, the first leg having a surface in engagement with the first flange outer surface and the second leg having a surface in engagement with the second flange outer surface, at least the clamp leg surface engaged with the first flange being arcuate.

21. The joint seal arrangement of clam 20 wherein at least one of the first and second clamp legs have an arcuate surface engaged with a respective first and second flange outer surface.

22. The joint seal arrangement of claim 20 wherein at least the first clamp leg has a length, the first leg being arcuate substantially along its length.

23. The joint seal arrangement of claim 20 wherein the legs are joined to a circular cylindrical interconnecting member forming a channel with the interconnecting member.

24. The joint seal arrangement of claim 23 wherein the legs are at an angle to the interconnecting member.

25. The joint seal arrangement of claim 23 wherein the legs are at an acute angle to the interconnecting member and substantially parallel to the mating outer flange surface.

26. The joint seal of claim 20 wherein the clamp first leg is arcuate and the second leg is conical.

27. The joint seal arrangement of claim 1 wherein the second flange outer surface is conical and the first flange outer surface is spherical, the clamp having substantially conical first and second legs, each leg having a clamp surface for engaging a corresponding flange outer surface of the first and second flanges.

28. The joint seal arrangement of claim 1 wherein the second flange forms an enclosed corner with the second pipe outer surface, the seal for abutting the second flange and second pipe outer surface at the corner.

29. The joint seal arrangement of claim 28 wherein the corner defines an acute angle, the seal being wedged in the corner by the clamp.

30. An automotive exhaust pipe joint and seal arrangement for joining two adjacent exhaust pipes in exhaust gas sealed relation to each other comprising:
   first and second exhaust pipes each defining a longitudinal axis and having respective corresponding adjacent first and second ends, each pipe having an outer cylindrical surface and an end edge;
   an annular first flange having opposing inner and outer surfaces, the flange being outwardly flared from the first end of the first pipe outer surface;
   an annular second flange extending radially outwardly from the second end of the second pipe outer surface, at least a portion of the second flange defining an outwardly flared outer surface;
   an annular fluid seal having outer surfaces and located between and abutting the first flange inner surface and the second flange and abutting the second pipe outer cylindrical surface adjacent to the second flange; and
   an annular band clamp attached to and abutting the first and second flanges at their respective outwardly flared outer surfaces for securing the first and second pipes to the seal in exhaust gas sealing relationship;
   the clamp having a clamp surface engaged with and corresponding to a respective different flange outer surface of the first and second flanges, the first flange outer surface engaged with a clamp surface and the first flange inner surface engaged with a seal outer surface, each engagement being arranged to abut substantially only at a corresponding tangential point forming a pair of tangential points, the pair of tangential points defining a plane substantially normal to the engaged first flange surfaces and engaged seal surface;
   the second flange forming an enclosed corner with the second pipe outer surface, the seal for abutting the second flange and second pipe outer surface at the corner.

31. The joint seal arrangement of claim 30 wherein the second flange is welded to the outer surface of the second pipe.

32. The joint seal arrangement of claim 30 wherein the second flange is one piece and formed from a portion of the second pipe and the first flange is one piece and formed from the first pipe.

33. The joint seal arrangement of claim 30 wherein the seal is wedged in the enclosed corner in wedged relationship with the second flange and second pipe outer surface.

* * * * *